(12) United States Patent
Horio

(10) Patent No.: US 8,097,659 B2
(45) Date of Patent: Jan. 17, 2012

(54) FLEXIBLE POLYURETHANE FOAM AND A METHOD OF PRODUCING THE SAME

(75) Inventor: Fuminori Horio, Aichi (JP)

(73) Assignee: Inoac Corporation, Aichi (JP)

( * ) Notice: Subject to any disclaimer, the term of this patent is extended or adjusted under 35 U.S.C. 154(b) by 128 days.

(21) Appl. No.: 11/624,847

(22) Filed: Jan. 19, 2007

(65) Prior Publication Data

US 2007/0117875 A1 May 24, 2007

(51) Int. Cl.
C08G 18/10 (2006.01)
C08J 9/00 (2006.01)
B29B 7/30 (2006.01)

(52) U.S. Cl. ............ 521/133; 521/131; 521/47; 521/49; 521/172; 528/85

(58) Field of Classification Search .................. 521/131, 521/172, 47, 49; 528/85
See application file for complete search history.

(56) References Cited

U.S. PATENT DOCUMENTS

| 5,643,970 | A | | 7/1997 | Sulzbach |
| 5,910,515 | A | * | 6/1999 | Chittolini ................... 521/109.1 |
| 6,046,249 | A | * | 4/2000 | Tobias et al. .................. 521/172 |
| 6,423,756 | B1 | * | 7/2002 | Ghobary et al. ............. 521/128 |
| 6,457,777 | B1 | * | 10/2002 | Kazuno et al. ........... 297/452.48 |
| 7,278,608 | B2 | * | 10/2007 | Shumate et al. ........... 244/129.1 |
| 7,464,658 | B2 | * | 12/2008 | Dhellemmes et al. ...... 114/74 A |

FOREIGN PATENT DOCUMENTS

| JP | 11-35725 A | | 2/1999 |
| JP | 2001002749 A | | 1/2001 |
| JP | 2001205658 A | | 7/2001 |
| JP | 2001270928 A | | 10/2001 |
| JP | 2006-192720 | * | 7/2006 |
| JP | 2006192720 A | * | 7/2006 |
| WO | 2005054327 A1 | | 6/2005 |

OTHER PUBLICATIONS

Technical Data Sheet for Polytetramethylene ether glycol from Aceto.*
Woods, "An introduction to polyurethanes", The ICI Polyurethanes Book, 8 pgs, 1987.

* cited by examiner

Primary Examiner — Randy Gulakowski
Assistant Examiner — Kara Negrelli
(74) Attorney, Agent, or Firm — Seager, Tufte & Wickhem LLC

(57) ABSTRACT

A flexible polyurethane foam is obtained by making a material containing polyols, a cross-linking agent and a polyisocyanate compound react in the presence of a catalyst, a blowing agent and an auxiliary blowing agent. At this time, the isocyanate index of the polyisocyanate compound is set to 110 to 120. Preferably, a polyol of which the hydroxyl value is 250 mg KOH/g to 650 mg KOH/g and of which the molecular weight is 150 to 500 is used as the cross-linking agent, and concretely, polyethylene glycol can be used. A liquefied carbon dioxide is used as the auxiliary blowing agent with an amount mixed in of 1.5 mass parts to 6.0 mass parts relative to 100 mass parts of the polyols. The load required for compressing to 25% of the initial thickness is 30 N to 70 N, and thus, the flexible polyurethane foam has a low hardness.

1 Claim, No Drawings

FLEXIBLE POLYURETHANE FOAM AND A METHOD OF PRODUCING THE SAME

BACKGROUND OF THE INVENTION

The present invention relates to flexible polyurethane foam used as, for example, a cushion material for automobile seats, and a method of producing the same.

In general, automobile seats using a cushion material are formed by attaching a surface skin material, for example cloth or leather, to the surface of flexible polyurethane foam by adhesion or sewing. This is in order to prevent wrinkling on the surface of the seat cushion material, increase the voluminous look, or improve the workability in sewing after cutting. In recent years, the need for softening the surface of seats in order to improve the comfort ride on the seat, particularly in luxury cars, has increased. Therefore, it has also been required for flexible polyurethane foam to be softened. As a conventional technique for reducing the hardness of flexible polyurethane foam, a technique for lowering the ratio of polyisocyanate to polyol in the raw material, that is to say, the isocyanate index, and a technique for increasing the ratio of use of a nonreactive auxiliary blowing agent, for example methylene chloride or carbon dioxide, have been adopted.

In accordance with the former technique, however, though the hardness of the flexible polyurethane foam becomes low, the overall crosslink density of the foam becomes low, and thus, the hardness is reduced when the foam is compressed. As a result, a problem arises that sitting-on-the-bottom sensation is felt when sinking down on the polyurethane foam. That is to say, the compression deflection coefficient, which is calculated by dividing the load required for compressing the foam to 65% of the initial thickness by the load required for compressing the same foam to 25% of the initial thickness is as small as approximately 2. Therefore, though a passenger in an automobile feels softness when sitting in the seat using a cushion material, the passenger also feels the "sitting-on-the-bottom sensation", and therefore, a problem arises, that the seat cushion gives uncomfortable ride. The "sitting-on-the-bottom" is a phenomenon where stress suddenly increases, when the seat sinks down to the proximity of the bottom portion under a load. The above described calculation of the compression deflection coefficient is defined in JIS K6400-2, which is a Japan Industrial Standard.

Meanwhile, in accordance with the latter technique, the nonreactive auxiliary blowing agent, for example methylene chloride can dissolve flexible polyurethane foam. Therefore, the flexible polyurethane foam cracks during the manufacturing process, or the tensile strength of the obtained flexible polyurethane foam becomes low. Therefore, the flexible polyurethane foam lacks flexibility, and makes a passenger feel the sitting-on-the-bottom sensation when sitting in the seat cushion material, and thus, a problem arises that the seat cushion gives uncomfortable ride. In addition, in the case of using carbon dioxide, the gas pressure suddenly rises, making it difficult to control the gas pressure, and thereby, a problem arises that the cell size of the foam becomes random or the foam cracks.

Japanese Laid-Open Patent Publication 11-35725 discloses a method for obtaining a soft feel. According to this publication, a high-reactive polyol is used and a low molecular weight polyol which is even more reactive and has a low molecular weight is also used, and thereby, reactivity between a polyol and a polyisocyanate is increased, in order to solve the particular problem of the reactivity becoming low when an auxiliary blowing agent is used. U.S. Pat. No. 5,643,970 discloses a method for obtaining uniform cells according to which an expanded flow path is provided in the flow path for the raw material, and thereby, the flow rate of the raw material is adjusted by flow resistance.

In the case where a passenger feels seat-crushed sensation when sitting in a seat cushion, the seat cushion gives uncomfortable ride, and the passenger also feels sitting-on-the-bottom sensation, which is not preferable. In accordance with the technology described in Japanese Laid-Open Patent Publication 11-35725, seat crushing is suppressed mainly by forming the cells in the flexible polyurethane foam in such a manner that the cells are oblong not in the rising direction of the thickness of the flexible polyurethane foam but in the direction along a plane of the flexible polyurethane foam which is perpendicular to the rising direction of the thickness. Therefore, even though a soft feel is obtained, stress (hardness) is insufficient, particularly when the ratio of compression becomes high. Accordingly, the seat-crushed sensation and the sitting-on-the-bottom sensation are not sufficiently reduced, and thus, the technology described in Japanese Laid-Open Patent Publication 11-35725 is not satisfactory.

In accordance with the technology described in U.S. Pat. No. 5,643,970, the cells in the flexible polyurethane foam can be made uniform. However, no method for adjusting the hardness while maintaining the flexibility is disclosed, and thus, the seat-crushed sensation and the sitting-on-the-bottom sensation cannot be suppressed in accordance with the technology described in U.S. Pat. No. 5,643,970.

SUMMARY OF THE INVENTION

Accordingly, it is an objective of the present invention to provide a flexible polyurethane foam that has flexibility and suppresses the seat-crushed sensation and the sitting-on-the-bottom sensation, and a method of producing the same.

To achieve the forgoing and other objects and in accordance with the purpose of the present invention, a flexible polyurethane foam is obtained through reaction of a raw material containing polyols and a polyisocyanate compound in the presence of a catalyst, a blowing agent, and an auxiliary blowing agent. The isocyanate index of said polyisocyanate compound is 110 to 120. The auxiliary blowing agent is liquefied carbon dioxide. The load required for compressing said flexible polyurethane foam to 25% of the initial thickness is 30 N to 70 N.

Further, the present invention provides a method of producing a flexible polyurethane foam according to which a raw material containing polyols, a cross-linking agent, and a polyisocyanate compound is made to react in the presence of a catalyst, a blowing agent, and an auxiliary blowing agent, and thereby, a flexible polyurethane foam is obtained. The isocyanate index of said polyisocyanate compound is 110 to 120. The auxiliary blowing agent is a liquefied carbon dioxide. The load required for compressing said flexible polyurethane foam to 25% of the initial thickness is 30 N to 70 N.

Other aspects and advantages of the invention will become apparent from the following description, taken in conjunction with the accompanying drawings, illustrating by way of example the principles of the invention.

DETAILED DESCRIPTION OF THE PREFERRED EMBODIMENTS

In the following, preferred embodiments of the present invention are described in detail. The flexible polyurethane foam (hereinafter simply referred to as foam) of the present embodiment is obtained by reacting a raw material which contains polyols and polyisocyanates compound in the presence of catalysts, blowing agents and auxiliary blowing agents. The foam has an open cell structure, and has properties that recovers from a compressed state.

Examples of the above described polyols include polyether polyols and polyester polyols. Examples of the polyether polyols include polypropylene glycol, polytetramethylene glycol and modified substances of these, as well as compounds where an alkylene oxide is added to glycerine. Examples of the polyester polyols include condensation polyester polyol obtained by reacting a polycarboxylic acid with a polyol and a lactone type polyester polyol, as well as a polycarbonate based polyol. Examples of the polycarboxylic acid include adipic acid and phthalic acid. Examples of the polyol reacting with the polycarboxylic acid include ethylene glycol, diethylene glycol, propylene glycol and glycerine. The number of hydroxyl groups and the hydroxyl value of the polyols can be changed by adjusting the type, the molecular weight and the degree of condensation of the raw material components for the polyols.

The hydroxyl value of the polyols is preferably less than 250 mg KOH/g, more preferably 50 mg KOH/g to 60 mg KOH/g. A polyether polyol having such a hydroxyl value have an excellent reactivity with polyisocyanate compounds, and an appropriate cross linked foam can be obtained. In the case where the hydroxyl value of polyols are no less than 250 mg KOH/g, the crosslink density becomes excessively high, and therefore, there is a risk that the foam may become hard, making the feel of the foam worsen. In the case where the hydroxyl value is less than 50 mg KOH/g, the hydroxyl value is too small and the crosslink density of the foam becomes low, making it easy for the foam to buckle.

Preferably, the material for the foam further contains a cross-linking agent made of a polyol. This cross-linking agent reacts with, for example, a polyisocyanate compound to form a cross-linking structure in the foam. The hydroxyl value of the polyol is 250 mg KOH/g to 650 mg KOH/g, and the molecular weight of the polyol is 150 to 500. Examples of the polyol include polyethylene glycol, diethylene glycol, polypropylene glycol, glycerine, trimethylolpropane, pentaerythritol, and sorbitol. From among these, polyether diols, for example polyethylene glycol, diethylene glycol or polypropylene glycol, are preferable. A structure where the linked polymers that form the foam extend in straight chain form is formed by using a polyether diol, and thus, the flexibility of the foam can be made excellent.

In the case where the hydroxyl value of the polyol is less than 250 mg KOH/g, the cross-linking reaction between the cross-linking agent and the polyisocyanate compound is insufficient, making the crosslink density of the foam low. In the case where the hydroxyl value of the polyol exceeds 650 mg KOH/g, the crosslink density of the foam becomes too high due to excessive cross-linking reaction. In addition, in the case where the molecular weight of the polyol is less than 150, the foam becomes excessively hard, making the feel worsen. In the case where the molecular weight of the polyol exceeds 500, the foam becomes too soft, causing the seat-crushed sensation and the sitting-on-the-bottom sensation.

The content of a cross-linking agent in the raw material is preferably 1.5 mass parts to 4.0 mass parts relative to 100 mass parts of polyols. In the case where the amount of cross-linking agent mixed in is less than 1.5 mass parts, an adequate cross-linking structure cannot be formed in the foam, making it easy for the seat-crushed and sitting-on-the-bottom sensations to be caused. In the case where the amount of cross-linking agent mixed in exceeds 4.0 mass parts, the cross-linking structure of the foam becomes excessively dense and the foam lacks softness, making the feel worsen.

The polyisocyanate compound which reacts with the polyols is a compound having a number of isocyanate groups. Examples of the polyisocyanate include tolylene diisocyanate (TDI), 4,4-diphenylmethane diisocyanate (MDI), 1,5-naphthalene diisocyanate (NDI), triphenylmethane triisocyanate, xylylene diisocyanate (XDI), hexamethylene diisocyanate (HDI), dicyclohexylmethane diisocyanate and isophorone diisocyanate (IPDI).

The isocyanate index of the polyisocyanate compound is 110 to 120. The isocyanate index is the ratio of isocyanate groups in the polyisocyanate compound to the hydroxyl groups in the polyols, the hydroxyl groups in the polyol functioning as a cross-linking agent, and a blowing agent, for example water, represented in percentages. An isocyanate index exceeding 100 means that the isocyanate groups are excessive relative to the hydroxyl groups. In the case where the isocyanate index is less than 110, the reaction of the polyisocyanate compound with the polyols and the polyol functioning as a cross-linking agent is insufficient, and the foam becomes soft, causing the seat-crushed and sitting-on-the-bottom sensations. In the case where the isocyanate index exceeds 120, the foam becomes hard and a soft feel is not obtained.

The catalyst accelerates the reaction between the polyols, the polyol functioning as a cross-linking agent and the polyisocyanate compound in the raw material through which polyurethane is created. Examples of the catalyst include tertiary amines, organic metal compounds, acetates and alkali metal alcoholate. Examples of the tertiary amine include N,N',N'-trimethyl aminoethyl piperazine, triethylenediamine and dimethyl ethanol amine. Examples of the organic metal compound include tin octylate.

The blowing agent makes foam to form polyurethane. Examples of this blowing agent include acid amides, in addition to water. The amount of blowing agent mixed in is smaller than usual so that the progress of the hardening reaction can be suppressed, preferably 1.5 mass parts to 3.0 mass parts per 100 mass parts of the polyols. In the case where the amount of blowing agent mixed in is less than 1.5 mass parts, the foaming reaction becomes insufficient. In the case where the amount of blowing agent mixed in exceeds 3.0 mass parts, the foaming reaction and the cross-linking reaction proceed too much and the foam easily becomes hard.

The auxiliary blowing agent is a liquefied carbon dioxide which is non-reactive to the polyols, the polyol functioning as a cross-linking agent and the polyisocyanate compound, and lowers the hardness of the foam. This auxiliary blowing agent is considered to function in the following manner. The reaction between the polyisocyanate compound and the polyols, through which polyurethane is generated, that is to say, the reaction through which urethane bonds are created proceeds as shown in the following reaction formula (1). In addition, the foaming reaction between the polyisocyanate compound and water proceeds as shown in the following reaction formula (2).

$$\text{—R—NCO} + \text{ROH} \rightarrow \text{—R—NH—CO—O—R} \quad (1)$$

$$\text{—R—NCO} + \text{H}_2\text{O} \rightarrow \text{—R—NH}_2 + \text{CO}_2 \quad (2)$$

The reaction between the amine compound (—R—NH$_2$) that is generated in the reaction formula (2) and the polyisocyanate compound, through which urea bonds are created, proceeds as shown in the following reaction formula (3).

$$\text{—R—NCO} + \text{—R—NH}_2 \rightarrow \text{—R—NH—CO—NH—R} \quad (3)$$

In the case where a liquefied carbon dioxide is used as the auxiliary blowing agent, the concentration of the carbon dioxide ($CO_2$) becomes high in the above described reaction formula (2), and therefore, the progress of the reaction is slowed, and thus, generation of the amine compound (—R—$NH_2$) is suppressed. Therefore, the amount of compounds on the left side in the above described reaction formula (3) becomes small, making the progress of the reaction slow. The cohesive force caused by hydrogen bonding in urea bonds is stronger than that in urethane bonds, and therefore, the hardness of the foam becomes high in the presence of urea bonds. Accordingly, the hardness of the foam can be reduced by suppressing the generation of urea bonds. Furthermore, this liquefied carbon dioxide does not dissolve the foam, and therefore, reduction in the strength and deterioration of the residual strain resulting from compression can be prevented from being caused.

The amount of auxiliary blowing agent mixed in is preferably 1.5 mass parts to 6.0 mass parts relative to 100 mass parts of the polyols. In the case where the amount of auxiliary blowing agent mixed in is less than 1.5 mass parts, sufficient effects of the auxiliary blowing agent cannot be obtained. In the case where the amount of auxiliary blowing agent mixed in exceeds 6.0 mass parts, the flexibility of the foam increases, and there is a risk that the seat-crushed and sitting-on-the-bottom sensations may be felt. In the case where a liquefied carbon dioxide is contained in the raw material as an auxiliary blowing agent, the liquefied carbon dioxide dissolves in the polyols, for example. At this time, the liquefied carbon dioxide dissolves under conditions where a carbon dioxide can remain in a liquefied state, under a pressure of 5 MPa to 7 MPa and a temperature of −12° C. to −20° C.

The raw material for the foam may further contain a foam stabilizer, for example a surfactant, a flame retardant, for example condensation phosphate ester, an antioxidant, a plasticizer, an ultraviolet ray absorbing agent, and a coloring agent if necessary.

In the above described reaction between the polyols, the polyol functioning as a cross-linking agent and the polyisocyanate compound, through which urethane is generated, a one-shot method or a prepolymer method is adopted. The one-shot method is a method for making the polyols and the polyol functioning as a cross-linking agent react directly with the polyisocyanate compound. The prepolymer method is a method according to which the polyols and the polyol functioning as a cross-linking agent are made to partially react with part of the polyisocyanate compound in advance, so that a prepolymer having an isocyanate group or a hydroxyl group at a terminal is obtained, and after that, the polyols and the polyol functioning as a cross-linking agent or the polyisocyanate compound is made to react with this prepolymer. In the one-shot method, the manufacturing process can be finished in a single step, there are few restrictions in terms of the conditions for manufacture, and the manufacturing cost can be reduced unlike in the prepolymer method, and therefore, the one-shot method is preferable.

As the foam, soft slab polyurethane foam is preferable. The raw material (mixed liquid for reaction) that has been mixed in and stirred in accordance with the above described one-shot method is discharged onto a conveyor belt, and the raw material foams naturally at room temperature (25° C.) under atmospheric pressure, and hardens while moving on the conveyor belt, and thereby, the soft slab polyurethane is obtained. After that, the soft slab polyurethane foam is cured in a drying furnace and cut into pieces of a predetermined form. In addition to this, a mold foaming method, an on-site spray foaming method or the like can be used to obtain the foam.

The load required for compressing the foam to 25% of the initial thickness is 30 N to 70 N, and the foam of the present embodiment has a low hardness in comparison with conventional foams. Furthermore, the compression deflection coefficient, which is calculated by dividing the load required for compressing the foam to 65% of the initial thickness, by the load for obtaining 25% compression of the initial thickness, is preferably 3.0 to 4.0. In addition, the load required for compressing the foam to 5% of the initial thickness is preferably 0.3 N to 3.0 N, the density of the foam is preferably 20 kg/m$^3$ to 41 kg/m$^3$, and the residual strain resulting from compression of the foam is preferably 1.2% to 2.5%. In the following description, the load required for compressing the foam to 5% of the initial thickness is referred to as "load at 5% compression," the load required for compressing the foam to 25% of the initial thickness is referred to as "load at 25% compression," and the load required for compressing the foam to 65% of the initial thickness is referred to as "load at 65% compression."

The compression deflection coefficient indicates the ratio of the load at 65% compression to the load at 25% compression, and is also referred to as the CI value (comfort index). In the case where the compression deflection coefficient is less than 3.0, there is a risk that the seat-crushed and sitting-on-the-bottom sensations may be felt. In the case where the compression deflection coefficient exceeds 4.0, there is a risk that the foam may have a hard feel. In addition, in the case where the foam is foamed in plate form, x/y is greater than 1 and no greater than 1.5 for cells in the foam, where the length in the rising direction of the thickness of the foam is represented by x and the length in the direction of a plane is represented by y. That is to say, the cells are in elliptical form and long in the rising direction of the thickness, rather than in the direction of a plane of the foam. Measurement of the load at each time of compression, for example the load at the time of compression to 25%, is defined in detail in JIS K6400-2.

The material that contains the polyols, the polyol functioning as a cross-linking agent and the polyisocyanate compound reacts in the presence of a catalyst, water, which is a blowing agent, and a liquefied carbon dioxide, which is an auxiliary blowing agent, so as to foam and be cured, and thus, the foam is manufactured. At this time, the isocyanate index of the polyisocyanate compound is 110 to 120, and therefore, reactivity of the polyisocyanate compound to the polyols, for example, increases, so that the reaction through which urethane is generated (polymerization reaction) sufficiently progresses and the cross-linking reaction also progresses. As a result, the foam becomes of a certain hardness. In addition, a polyol having a high hydroxyl value (250 mg KOH/g to 650 mg KOH/g) is used as the cross-linking agent, and thereby, the cross-linking agent reacts with the polyisocyanate compound, so that an additional cross-linking structure is formed, and thus, the foam becomes rigid.

The foam is formed of hard segments made of urethane bonds and urea bonds, and soft segments made of ether bonds having a methylene group. In addition, in the case where the molecular weight of the polyol functioning as a cross-linking agent is 150 to 500, the cohesion of the hard segments, particularly those made of urea bonds, is hindered, and the distribution in the molecular weight is disturbed, and thus, the foam is prevented from becoming hard.

A liquefied carbon dioxide is used as an auxiliary blowing agent, and therefore, the foaming reaction and the cross-linking reaction are slowed and the foam gives plasticity to be softened. These effects work together so that the foam becomes soft while a sudden change in the stress (force of repulsion) at the time of compression is prevented. In particular, the foam can maintain the hardness at a later phase of compression, for example at 65% compression.

The present embodiment has the following advantages.

The isocyanate index of the polyisocyanate compound of the present embodiment is set to 110 to 120, and therefore, reactivity of the polyisocyanate compound to, for example, polyols, can be secured, so that the hardness of the obtained foam can be kept within an appropriate range. In addition, a liquefied carbon dioxide is used as an auxiliary blowing agent, and therefore, generation of urea bonds is particularly suppressed, making the hardness of the foam low, and the foam becomes flexible. The load at 25% compression is 30 N to 70 N, and thus, the foam has a low hardness, and a good feel can be obtained in the middle phase of compression. Accordingly, the foam has a soft feel, and the seat-crushed and sitting-on-the-bottom sensations are suppressed, and thus, comfort in riding can be obtained when applied to a seat cushion.

In the case where the amount of the above described liquefied carbon dioxide mixed in is 1.5 mass parts to 6.0 mass parts relative to 100 mass parts of the polyols, the foam can give plasticity to a certain degree, and the foam becomes of an appropriate flexibility.

In the case where the raw material contains a cross-linking agent made of a polyol of which the hydroxyl value is 250 mg KOH/g to 650 mg KOH/g and of which the molecular weight is 150 to 500, the cross-linking agent reacts with the polyisocyanate compound so as to form a cross-linking structure, and thus, the foam becomes rigid. In addition, the polyol has a low molecular weight of 150 to 500, and therefore, cohesion of hard segments, particularly those made of urea bonds, can be prevented, and the hardness of the foam can be reduced by changing the distribution of the molecular weight.

In the case where the amount of cross-linking agent mixed in is 1.5 mass parts to 4.0 mass parts relative to 100 mass parts of the polyols, the cross-linking density of the foam can be kept within an appropriate range, and thus, the balance between the flexibility and the hardness can be improved.

In the case where the compression deflection coefficient of the foam is 3.0 to 4.0, the feel becomes soft and the ratio of the load at the time of compression comes within an appropriate range, and therefore, the seat-crushed and sitting-on-the-bottom sensations can be effectively suppressed.

In the case where the cross-linking agent is polyether diol, the foam has a structure where linked polymers extend in straight chain form, and the flexibility can be increased.

As described above, the foam has excellent flexibility, and the seat-crushed and sitting-on-the-bottom sensations can be suppressed, and therefore, the foam is appropriate for use in seat cushions for automobiles and chairs having a cushion material, for example.

In accordance with the method for manufacturing a foam, a raw material which contains a polyols, a cross-linking agent and a polyisocyanate compound is made to react in the presence of catalysts, a blowing agents and auxiliary blowing agents. At this time, the isocyanate index of the polyisocyanate compound is 110 to 120. The auxiliary blowing agent is a liquefied carbon dioxide. Furthermore, the load at 25% compression of the foam is 30 N to 70 N. Therefore, a foam having flexibility where the seat-crushed and sitting-on-the-bottom sensations are suppressed can be easily manufactured.

The present embodiment can be modified in the following manner.

As the auxiliary blowing agent, methylene chloride ($CH_2Cl_2$) or chlorofluorocarbon based compounds, for example trichlorofluoromethane or dichlorodifluoromethane, may be used together with a liquefied carbon dioxide.

As the cross-linking agent, bifunctional polyether diols, trifunctional polyether triols or a tetra-or-higher-functional polyol may be combined for use, so that the degree of cross-linking of the obtained foam can be adjusted.

The raw material for the foam may contain a compound having a hydroxyl group, for example propanol or butanol, so that the isocyanate index of the polyisocyanate compound can be adjusted.

The foam may be used as a buffering material, a vibration damping material, a mattress or a pillow, for example. Examples of the buffering material include door trims and center pillar garnish for automobiles. Examples of the vibration damping material include sealing materials.

In the following, the above described embodiment is described in further detail by citing examples and comparative examples.

Examples 1 to 5 and Comparative Examples 1 to 3

A raw material was prepared so as to contain polyols and a polyol functioning as a cross-linking agent, as well as tolylene diisocyanate (TDI-80) which is the polyisocyanate compound as shown in Tables 1 and 2. Next, the raw material was made to react in accordance with a conventional method in the presence of a catalyst, water, which is a blowing agent, and a liquefied carbon dioxide, which is an auxiliary blowing agent, and thereby, foam was manufactured. The liquefied carbon dioxide remained in a liquefied state in an atmosphere where the pressure was 6 MPa and the temperature was no higher than $-12°$ C., and was dissolved in polyether polyol, and thereby contained in the raw material. The meaning of the abbreviations and symbols in Tables 1 and 2 are given in the following. In Tables 1 and 2, the amount of each component is shown in mass parts relative to 100 mass parts of the polyols.

Voranol® 3010J: polyether polyol having 3 functional groups, made by Dow Polyurethane Company; the hydroxyl value is 56 mg KOH/g and the molecular weight is 3,000

PEG200: polyethylene glycol; the molecular weight is 200 and the hydroxyl value is 561 mg KOH/g PEG400: polyethylene glycol; the molecular weight is 400 and the hydroxyl value is 281 mg KOH/g TDI-80: tolylene diisocyanate, made by Nippon Polyurethane Industry Co., Ltd.; this tolylene diisocyanate is a mixture of 80% by mass of 2,4-tolylene diisocyanate and 20% by mass of 2,6-tolylene diisocyanate LV33: mixture of triethylenediamine and propylene glycol with a mass ratio of 1:2, which is a catalyst, made by Chukyo Yushi Co., Ltd.

MRH110: stannous octylate, which is a catalyst, made by Johoku Chemical Co., Ltd.

L584: silicone foam stabilizer made by Nippon Unicar Company Limited

The apparent density, the load at 5% compression, the load at 25% compression, the compression deflection coefficient, the cushion feel and the residual strain resulting from compression (compression set) of the obtained foam were measured in accordance with the method shown in the following, and the results are shown in Tables 1 and 2.

Apparent density ($kg/m^3$): measured in accordance with ISO845, which is an international standard (JIS K7222)

Residual strain resulting from compression (%): measured in accordance with ISO1856 (JIS K6400-4)

Load at 5% compression (N) and load at 25% compression (N): measured in accordance with JIS K6400-2. That is to say, a test piece made of the foam was prepared, and after that, this test piece was compressed to 5% and 25% of the initial thickness, and the load at each time of compression was measured. Then, the load when the test piece was compressed to 5% of the initial thickness was used as the load at 5% compression, and the load when the test piece was compressed to 25% of the initial thickness was used as the load at 25% compression.

Compression deflection coefficient: measured in accordance with JIS K6400-2. That is to say, a test piece made of the foam was prepared, and after that, this test piece was compressed to 65% of the initial thickness, and the load measured at this time of compression was used as the load at 65% compression. Then, the load at 65% compression was divided by the above described load at 25% compression, and thereby, the compression deflection coefficient was calculated.

Cushion feel: the feel when sitting on foam of which the thickness was 50 mm was evaluated.

TABLE 1

|  | Example | | | | |
|---|---|---|---|---|---|
|  | 1 | 2 | 3 | 4 | 5 |
| Polyether polyol (Voranol ® 3010J) | 100 | 100 | 100 | 100 | 100 |
| PEG200 | — | 3.0 | — | — | — |
| PEG400 | — | — | — | 4.0 | — |
| Tolylene diisocyanate | 33.4 | 36.4 | 28.2 | 30.1 | 38.8 |
| Isocyanate index | 115 | 115 | 112 | 112 | 118 |
| Amine catalyst (LV33) | 0.3 | 0.3 | 0.3 | 0.3 | 0.3 |
| Stannous octylate (MRH110) | 0.2 | 0.2 | 0.2 | 0.2 | 0.2 |
| Silicone foam stabilizer (L584) | 1.0 | 1.0 | 1.0 | 1.0 | 1.0 |
| Water as blowing agent | 2.1 | 2.1 | 1.7 | 1.7 | 2.5 |
| Liquefied carbon dioxide as auxiliary blowing agent | 2.8 | 2.8 | 1.7 | 1.7 | 5.4 |
| Apparent density (kg/m³) | 30 | 31 | 40 | 41 | 22 |
| Load at 5% compression (N) | 0.9 | 0.7 | 2.7 | 2.1 | 1.2 |
| Load at 25% compression (N) | 50 | 40 | 68 | 55 | 40 |
| Compression deflection coefficient | 3.4 | 3.8 | 3.7 | 3.9 | 3.2 |
| Cushion feel | Good | Excellent | Good | Excellent | Good |
| Residual strain resulting from compression (%) | 2.1 | 1.9 | 1.9 | 1.2 | 2.5 |

As shown in Table 1, in the foams of Examples 1 to 5, the compression deflection coefficient was within a range from 3.0 to 4.0, the load at 5% compression was within a range from 0.3 N to 3.0 N, and the load at 25% compression was within a range from 30 N to 70 N. Therefore, the cushioning properties of the foams of Examples 1 to 5 were all good. Furthermore, the apparent density was within a range from 20 kg/m³ to 41 kg/m³, and the residual strain resulting from compression was within a range from 1.2% to 2.5%. Judging from the above, the foams of Examples 1 to 5 were appropriate particularly for seat cushion.

TABLE 2

|  | Comparative Example | | |
|---|---|---|---|
|  | 1 | 2 | 3 |
| Polyether polyol (Voranol ® 3010J) | 100 | 100 | 100 |
| Tolylene diisocyanate | 29.9 | 29.9 | 48.8 |
| Isocyanate index | 103 | 103 | 103 |
| Amine catalyst (LV33) | 0.3 | 0.3 | 0.3 |
| Stannous octylate (MRH110) | 0.2 | 0.2 | 0.2 |
| Silicone foam stabilizer (L584) | 1.0 | 1.0 | 1.0 |
| Water as blowing agent | 2.1 | 2.1 | 4.0 |
| Liquefied carbon dioxide as auxiliary blowing agent | — | 2.8 | — |
| Methylene chloride as auxiliary blowing agent | 13.0 | — | — |
| Apparent density (kg/m³) | 30 | 30 | 28 |
| Load at 5% compression (N) | 4.9 | 1.1 | 11.5 |
| Load at 25% compression (N) | 48 | 35 | 130 |
| Compression deflection coefficient | 2.1 | 1.9 | 1.8 |
| Cushion feel | sitting-on-the-bottom sensation | sitting-on-the-bottom sensation | seat-crushed sensation and hard |
| Residual strain resulting from compression (%) | 7.8 | 1.9 | 2.5 |

In contrast, as shown in Table 2, in Comparative Example 1, where the isocyanate index was small, methylene chloride was used instead of a liquefied carbon dioxide and a polyol was not used as the cross-linking agent, the compression deflection coefficient was as low as 2.1, and the sitting-on-the-bottom sensation was felt, in terms of the cushion feel. In Comparative Example 2, where the isocyanate index was small, even though a liquefied carbonic acid was used, and a polyol was not used as the cross-linking agent, the compression deflection coefficient was as low as 1.9, and the sitting-on-the-bottom sensation was felt in terms of the cushion feel. In Comparative Example 3, where the isocyanate index was small, a polyol was not used as the cross-linking agent, and in addition, a liquefied carbon dioxide was not used as the auxiliary blowing agent, the compression deflection coefficient was as low as 1.8, the seat-crushed sensation was felt, in terms of the cushion feel, and the foam was hard.

The invention claimed is:

1. A method of producing a flexible polyurethane foam having an open cell structure, according to which a raw material containing polyols, a cross-linking agent, and a polyisocyanate compound is made to react in the presence of a catalyst, a blowing agent, and an auxiliary blowing agent, and thereby, a flexible polyurethane foam is obtained,
   wherein a hydroxyl value of the polyols is 50 mg KOH/g to 60 mg KOH/g,
   wherein the polyols are polyether polyols having three hydroxyl groups;
   wherein when the polyurethane is obtained, the raw material is discharged onto a conveyer belt to foam and harden while moving on the conveyer belt,
   wherein the isocyanate index of said polyisocyanate compound is 112 to 120,
   wherein the blowing agent is water and the amount of the blowing agent mixed in is 1.5 mass parts to 3.0 mass parts relative to 100 mass parts of polyols,
   wherein the auxiliary blowing agent is a liquefied carbon dioxide,
   wherein the content of the liquefied carbon dioxide in said raw material is 1.5 mass parts to 6.0 mass parts relative to 100 mass parts of the polyols,
   wherein the amount of water is equal to or less than the content of the liquefied carbon dioxide,
   wherein, when a foaming reaction between the polyisocyanate compound and water proceeds in the presence of the liquefied carbon dioxide as the auxiliary blowing agent, generation of an amine compound ($-R-NH_2$) is suppressed and thus generation of urea bonds is suppressed, and
   wherein the density of the resulting foam is 20-41 kg/m³;

wherein the load required for compressing said flexible polyurethane foam to 25% of the initial thickness is 30 N to 70 N;

wherein the flexible polyurethane foam is cut in plate form and has an open cell structure, wherein the compression deflection coefficient, which is calculated by dividing the load for compressing the flexible polyurethane foam to 65% of the initial thickness by the load required for compressing the foam to 25% of the initial thickness is 3.0 to 4.0, and wherein x/y is greater than 1 and no greater than 1.5 in cells, where the length in the rising direction of the thickness of the foam is represented by x and the length in the direction of a plane of the foam is represented by y, and wherein the liquefied carbon dioxide is dissolved in the polyols under a pressure of 5 MPa to 7 MPa and a temperature of $-12°$ C. to $-20°$ C.

* * * * *